US009654383B2

(12) United States Patent
Babiarz et al.

(10) Patent No.: US 9,654,383 B2
(45) Date of Patent: May 16, 2017

(54) ROUTE OPTIMIZATION USING MEASURED CONGESTION

(75) Inventors: Jozef Babiarz, Kanata (CA); Bakul Khanna, Lexington, MA (US)

(73) Assignee: Avaya Inc., Basking Ridge, NJ (US)

( * ) Notice: Subject to any disclaimer, the term of this patent is extended or adjusted under 35 U.S.C. 154(b) by 1857 days.

(21) Appl. No.: 11/530,579

(22) Filed: Sep. 11, 2006

(65) Prior Publication Data

US 2007/0041326 A1   Feb. 22, 2007

Related U.S. Application Data

(63) Continuation-in-part of application No. 11/251,252, filed on Oct. 14, 2005, now abandoned.

(60) Provisional application No. 60/716,181, filed on Sep. 12, 2005, provisional application No. 60/708,963, filed on Aug. 17, 2005.

(51) Int. Cl.
| | |
|---|---|
| *H04L 12/707* | (2013.01) |
| *H04L 12/24* | (2006.01) |
| *H04L 12/26* | (2006.01) |
| *H04L 12/751* | (2013.01) |
| *H04L 12/729* | (2013.01) |
| *H04L 12/721* | (2013.01) |

(52) U.S. Cl.
CPC .......... *H04L 45/22* (2013.01); *H04L 41/5022* (2013.01); *H04L 43/08* (2013.01); *H04L 45/10* (2013.01); *H04L 45/125* (2013.01); *H04L 45/38* (2013.01); *H04L 41/5087* (2013.01)

(58) Field of Classification Search
USPC ....... 370/203, 235, 237, 241, 252, 253, 254, 370/256, 257, 258, 351, 356, 400, 401, 370/428, 429, 437, 468, 469; 709/224, 709/232, 238, 239, 242, 243
See application file for complete search history.

(56) References Cited

U.S. PATENT DOCUMENTS

| | | | |
|---|---|---|---|
| 5,218,676 | A | 6/1993 | Ben-Ayed et al. |
| 5,253,248 | A | 10/1993 | Dravida et al. |
| 5,745,694 | A | 4/1998 | Egawa et al. |
| 5,832,197 | A * | 11/1998 | Houji .............................. 714/4.3 |
| 6,041,354 | A | 3/2000 | Biliris et al. |
| 6,201,810 | B1 | 3/2001 | Masuda et al. |
| 6,252,847 | B1 | 6/2001 | Lee |

(Continued)

OTHER PUBLICATIONS

Peuhkuri, "IP Quality of Service", May 21, 1999, NetLab.tkk.fi, all pages.*

(Continued)

*Primary Examiner* — Kwang B Yao
*Assistant Examiner* — Adam Duda

(57) ABSTRACT

A flow based routing method and apparatus selects a path from a plurality of different paths for assignment to a flow. The path is selected based on a traffic performance measurements which identify relative congestion and performance of the different paths, so that traffic flows can be diverted away from network congestion points, thereby allowing network resources to be load balanced at a flow granularity. The present invention may be configured on physical or virtual links on an NE to enhance the forwarding of packets using the primary link and one or more alternate links to any given destination.

14 Claims, 4 Drawing Sheets

(56) References Cited

U.S. PATENT DOCUMENTS

| | | | |
|---|---|---|---|
| 6,275,470 B1* | 8/2001 | Ricciulli | F25B 41/003 370/238 |
| 6,345,287 B1 | 2/2002 | Fong et al. | |
| 6,366,945 B1 | 4/2002 | Fong et al. | |
| 6,487,177 B1* | 11/2002 | Weston-Dawkes | 370/254 |
| 6,788,646 B1 | 9/2004 | Fodor et al. | |
| 7,136,357 B2 | 11/2006 | Soumiya et al. | |
| 7,593,348 B2* | 9/2009 | Kodialam et al. | 370/254 |
| 8,369,220 B1 | 2/2013 | Khanna et al. | |
| 2001/0037401 A1* | 11/2001 | Soumiya et al. | 709/232 |
| 2002/0176363 A1 | 11/2002 | Durinovic-Johri et al. | |
| 2003/0021223 A1* | 1/2003 | Kashyap | 370/217 |
| 2004/0264675 A1 | 12/2004 | Delaney et al. | |
| 2005/0097219 A1 | 5/2005 | Goguen et al. | |
| 2006/0002304 A1 | 1/2006 | Ashwood-Smith | |
| 2006/0067213 A1 | 3/2006 | Evans et al. | |
| 2006/0209807 A1 | 9/2006 | Lor et al. | |
| 2007/0041326 A1 | 2/2007 | Babiarz et al. | |
| 2007/0268841 A1 | 11/2007 | Dube et al. | |
| 2009/0040938 A1 | 2/2009 | Klinker | |

OTHER PUBLICATIONS

Shand, M., Network Working Group Internet Draft, "IP Fast Reroute Framework," draf ietf rtgwg ipfrr framework-01, dated Jun. 2004.

Pham, Tito Q.; Non-final Office Action; U.S. Appl. No. 11/251,252; Jul. 1, 2008; U.S. Patent and Trademark Office; Alexandria, Virginia.

Pham, Tito Q.; Non-final Office Action; U.S. Appl. No. 11/251,252; Sep. 2, 2009; U.S. Patent and Trademark Office; Alexandria, Virginia.

Pham, Tito Q.; Non-final Office Action; U.S. Appl. No. 11/251,252; May 13, 2010; U.S. Patent and Trademark Office; Alexandria, Virginia.

Pham, Tito Q.; Non-final Office Action; U.S. Appl. No. 11/251,252; Nov. 4, 2010; U.S. Patent and Trademark Office; Alexandria, Virginia.

Pham, Tito Q.; Non-final Office Action; U.S. Appl. No. 11/251,252; Aug. 12, 2011; U.S. Patent and Trademark Office; Alexandria, Virginia.

Pham, Tito Q.; Final Office Action; U.S. Appl. No. 11/251,252; Feb. 27, 2009; U.S. Patent and Trademark Office; Alexandria, Virginia.

Pham, Tito Q.; Final Office Action; U.S. Appl. No. 11/251,252; Jan. 28, 2010; U.S. Patent and Trademark Office; Alexandria, Virginia.

Pham, Tito Q.; Final Office Action; U.S. Appl. No. 11/251,252; Apr. 6, 2011; U.S. Patent and Trademark Office; Alexandria, Virginia.

Pham, Tito Q.; Final Office Action; U.S. Appl. No. 11/251,252; Feb. 15, 2012; U.S. Patent and Trademark Office; Alexandria, Virginia.

Baron, Henry; Non-final Office Action; U.S. Appl. No. 12/006,128; Nov. 4, 2009; U.S. Patent and Trademark Office; Alexandria, Virginia.

Baron, Henry; Non-final Office Action; U.S. Appl. No. 12/006,128; Nov. 23, 2010; U.S. Patent and Trademark Office; Alexandria, Virginia.

Baron, Henry; Non-final Office Action; U.S. Appl. No. 12/006,128; Jan. 12, 2012; U.S. Patent and Trademark Office; Alexandria, Virginia.

Baron, Henry; Final Office Action; U.S. Appl. No. 12/006,128; Apr. 27, 2010; U.S. Patent and Trademark Office; Alexandria, Virginia.

Baron, Henry; Final Office Action; U.S. Appl. No. 12/006,128; Apr. 25, 2011; U.S. Patent and Trademark Office; Alexandria, Virginia.

Baron, Henry; Final Office Action; U.S. Appl. No. 12/006,128; Jul. 3, 2012; U.S. Patent and Trademark Office; Alexandria, Virginia.

Pham, Tito Q.; Advisory Action; U.S. Appl. No. 11/251,252; May 29, 2009; U.S. Patent and Trademark Office; Alexandria, Virginia.

Pham, Tito Q.; Advisory Action; U.S. Appl. No. 11/251,252; Jun. 17, 2011; U.S. Patent and Trademark Office; Alexandria, Virginia.

Chung, Jason J.; PTAB Decision on Appeal; U.S. Appl. No. 11/251,252; Jul. 6, 2015; U.S. Patent and Trademark Office; Alexandria, Virginia.

Ashwood-Smith, Peter; Related U.S. Appl. No. 11/251,252; Oct. 14, 2005; U.S. Patent and Trademark Office; Alexandria, Virginia.

Baron, Henry; Advisory Action; U.S. Appl. No. 12/006,128; Oct. 2, 2012; U.S. Patent and Trademark Office; Alexandria, Virginia.

Network Working Group Internet-Draft, "Basic Specification for IP Fast Reroute: Loop Free Alternates," by A. Atlas, draft-ietf-rtgwg-ipfrr-spec-base-05, dated Feb. 2006 (26 pages).

Network Working Group Internet-Draft, "Basic Specification for IP Fast Reroute: Loop Free Alternates," by A. Atlas, draft-ietf-rtgwg-ipfrr-spec-base-04, dated Jul. 15, 2005, 26 pages.

Babiarz, Jozef; Related U.S. Appl. No. 15/429,231; entitled Route Optimizatiion Using Measured Congestion; filed Feb. 10, 2017; United States Patent and Trademark Office; Alexandria, Virginia.

* cited by examiner

ROUTE OPTIMIZATION USING MEASURED CONGESTION

RELATED APPLICATIONS

This application claims priority under 35 U.S.C. §1.119 (e) to provisional patent application Ser. No. 60/716,181, filed Sep. 12, 2005, and is a continuation-in-part of patent application Ser. No. 11/251,252, filed Oct. 14, 2005, now abandoned which claims priority under 35 U.S.C. §119(e) to provisional application Ser. No. 60/708,963 filed Aug. 17, 2005. Each application identified in this paragraph is incorporated herein by reference.

FIELD OF THE INVENTION

This invention relates generally to the field of networking and more particularly to a method and apparatus for directing traffic around congestion in a network.

BACKGROUND OF THE INVENTION

Networks that need to support real-time inelastic services such as voice and video may need a controlled environment that allows guarantees on the quality of service to be provided to traffic. One method of ensuring that quality of service constraints can be met is to limit traffic on the network to an amount which is well below the network bandwidth limit. Such a solution is not cost effective as it blocks information from being transmitted on the network although other paths are under utilized and does not allow the full capacity of the network to be utilized. One method that is used to ensure that a network is fully utilized is to introduce traffic into the network onto different paths until the network becomes congested and packets are lost. However, lost packets adversely affect the quality of service realized by traffic in the network. Because real-time traffic is particularly sensitive to packet loss and delay it is desirable to detect congestion before packets are dropped or significantly queued and quality of service is adversely affected.

SUMMARY OF THE INVENTION

According to another aspect of the invention, a method is provided for selecting a path from a plurality of different paths for assignment to a flow. The path is selected by measuring congestion on the different paths and picking a path based on the congestion measurements. As a result traffic flows are diverted away from congested paths at a flow granularity. With such an arrangement the present invention enables load sharing of flows between multiple paths based on measured network congestion to ensure that a desired quality of service may be received by the flow.

According to a further aspect of the invention, a network element includes a flow cache for storing, for each flow traversing the network element, an outbound link identifying a next hop node to be used when forwarding each one of a plurality of packets of the flow. The next hop node is selected from a primary node associated with a primary path and one or more alternate nodes associated with alternate paths, in response to congestion measurements of the primary path and alternate path. With such an arrangement, quality of service guarantees can be met because flows are not mapped to paths that are congested.

According to another aspect of the invention, a network device includes first packet processing logic operable when executed in response to receipt of a packet to identify a flow associated with the packet and to forward the packet to an outbound link in a selected path associated with the determined flow. The selected path for the flow is selected in response to congestion measurement information for a plurality of available paths for the flow.

These and other advantages of the invention will be described with respect to the attached Figures.

DETAILED DESCRIPTION

Figure 1A:
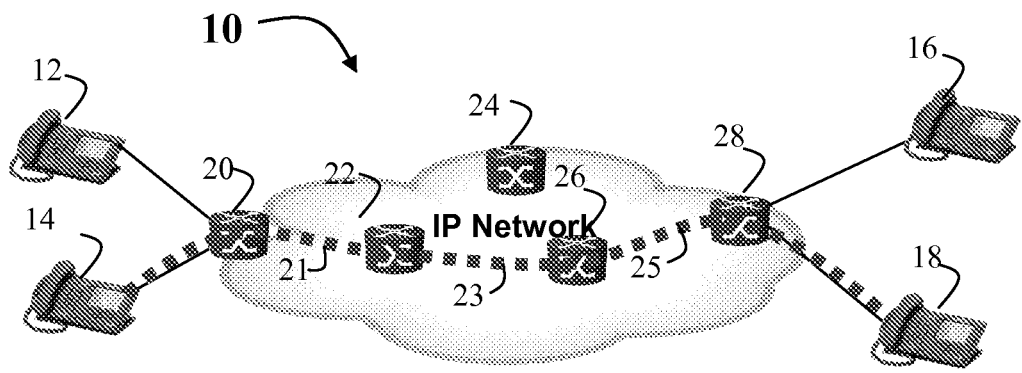
FIGS. 1A, 1B and 1C are network diagrams that are used to describe a method of the present invention of directing traffic flows around points of congestion in the network.

Voice over Internet Protocol (VoIP) is the convergence of traditional voice delivery on the data, or packet switched, network. VoIP protocols have two components: a control flow and a data flow. The control flow uses protocols such as Session Initiation Protocol (SIP), H.225 (for H.323), or Media Gateway Control Protocol (MGCP). The data flow or "media" component uses Real-Time Transport Protocol (RTP) and Real-Time Transport Control Protocol (RTCP). The control flow sets up the VoIP call signaling between the IP Phones or "end-points" (residing at end-user location) and the call manager or proxy (residing at service provider or HQ/central location). Once this handshake is established and determined to be valid and allowed by the security policy, then the media (or voice data) can flow through. The term 'flow' as used herein refers to a VoIP flow, but it should be mentioned that the present invention is not limited to VoIP, nor is the invention limited to the transfer of voice data. Rather, it will be apparent to those of skill in the art that the concepts of the invention may be applied to and benefit any real-time communication protocol where groups of packets are forwarded between end points.

Voice packet delivery requires network bandwidth that is different from data delivery. During a call, voice delivery continuously consumes large amount of bandwidth at a constant bit rate. If the network does not have available bandwidth for a voice call, the call's traffic can easily congest the network. Congestion causes packets to be delayed or dropped, resulting in a poor quality of service.

According to one aspect of the invention, each network element (i.e., router or other network device) performs traffic performance measurements on traffic per service class (e.g., DSCP) on its links. Traffic performance measurements may include a series of test run on physical and/or virtual links to measure traffic conditions of the path, the series of tests for measuring one or more of a performance, Quality of Service (QoS), onset of congestion and connectivity state of the physical or virtual links. The traffic measurements are used to when selecting a path for assignment to a flow to route flows around congested or otherwise undesirable paths. The present invention thus enables intelligent routing of flows in a network using real-time traffic performance information.

Token bucket is an example of traffic measurement method which may be used in the present invention. Token bucket is a control mechanism that dictates when traffic can be transmitted, based on the presence of tokens in the bucket. The token bucket contains tokens, each of which can represent a unit of bytes. The network administrator specifies how many tokens are needed to transmit however many number of bytes; when tokens are present, a new flow is allowed to transmit traffic on that path. Thus the number of tokens in a bucket is related to an ability of a next-hop device to service traffic.

According to one aspect of the invention, for each new flow that is received at a NE, if there are no tokens in the bucket for a primary next hop associated with the destination of the flow, the network element (NE) selects an alternate next-hop from a list of alternate next hops and transmits all packets belonging to that flow using the uncongested next-hop. Normally the token bucket is configured so it runs out of tokens before any significant amount of queuing of packets belonging to real-time flows cures and thus is used to provide an early warning of onset of congestion. A congestion mechanism that monitors token bucket population may be used in the present invention for congestion detection. Other traffic shaping methods such as the leaky bucket algorithm and others known in the art may be readily substituted herein.

According to one aspect of the invention, Admission Control mechanisms may be used to signal congestion to the endpoints in case all available paths are congested, improving the ability of the network to provide high quality of service to traffic.

Potential paths to end-points are identified at each network element (NE) prior to the receipt of a flow by the NE. In one embodiment the potential paths include a primary path and one or more alternate paths, which are stored in a next-hop list. The packet metering of real-time traffic is performed all the time. When a new flow is received at a NE implementing the present invention, traffic performance measurements are used to determine a traffic state of the path and to select the appropriate next hop NE from the list. For example, a path may be in a Brownout state, where either one or both of the following are true: the measured traffic level on the physical or virtual link or service class is above an engineered limit, indicating onset of congestion, and the measured performance or QoS on the physical or virtual link or service class is below a measured level. When onset of congestion of the primary next-hop is detected, an alternate uncongested next-hop is selected. In one embodiment, the alternate path is automatically assigned as the flow path in the presence of congestion at the primary path. In a second embodiment, traffic performance measurements are performed on the alternate next-hop, and either the primary or alternate next-hop is selected based on relative congestions of the paths.

Detected onset of congestion may indicate congestion of the service class of physical links or Performance/QoS of the service class, for virtual links. In other words, the present invention addresses the ability to route application flows to alternate physical or virtual links based on onset of congestion and or degradation of performance on the selected link. This allows flows to achieve an acceptable level of service during brownout (path congestion and for virtual links if the measured performance/QoS status is below the configured acceptable performance level) or blackout (when the network or portion of the network fails completely due to link or equipment failures or human configuration errors) scenarios in the network thereby increasing the availability and resiliency of existing distributed IP networks.

Although standard routing protocols can detect and repair network blackouts those protocols are slow to converge once an outage is detected. Such routing protocols will eventually route around a blackout, they will never route around a brownout; routing protocols only detect loss of link availability, not degraded performance. The present invention overcomes the inadequacies of standard routing protocols by identifying congested links (next-hop) or performance degradation, enabling flows to be routed around network brownout and blackout conditions quickly without dropping or mis-ordering packets.

Figure 1B:
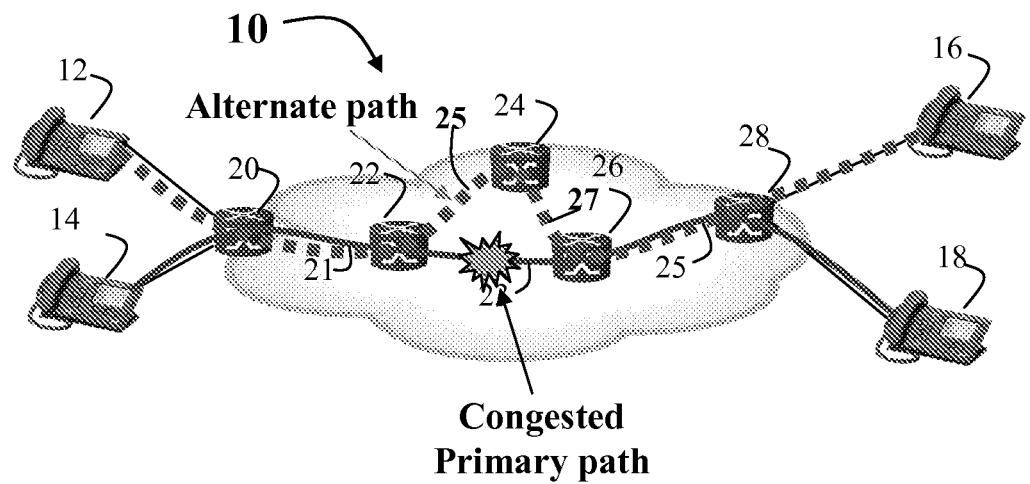

FIGS. 1A and 1B are block diagrams of a network 10 in which the present invention may be implemented. A number of VoIP devices, such as VoIP phones 12, 14, 16 and 18, are coupled together via an IP network 10 comprised of NEs 20, 22, 24, 26 and 28. A dashed line illustrates a path between VoIP phone 14 and 18, which traverses NEs 20, 22, 26 and 28 on links 21, 23 and 25. The path is comprised of links 21, 23 and 25 is the primary path for transmissions between device 20 and 28, wherein the primary path may have been selected in a variety of manners known to those of skill in the art. When end-point 14 seeks to establish a connection with end-point 18, after the session establishment phase, application data packets are forwarded between the end-points. In FIG. 1A, no onset of congestion is identified, and the flow is routed on the primary path.

However, FIG. 1B illustrates the effect of onset of congestion being identified in the primary path at time of application's media first packet transmission. On reception of the first application data packet from end-point 12 heading to end-point 16, NE 22 measured that its primary next-hop link 23 is congested or is experiencing performance degradations, and therefore looks through its list of alternate and uncongested next-hops available and it finds link 25. NE 22 enters flow state and all application data packets from end-point 12 heading to end-point 16 will be routed on link 25.

Figure 1C:
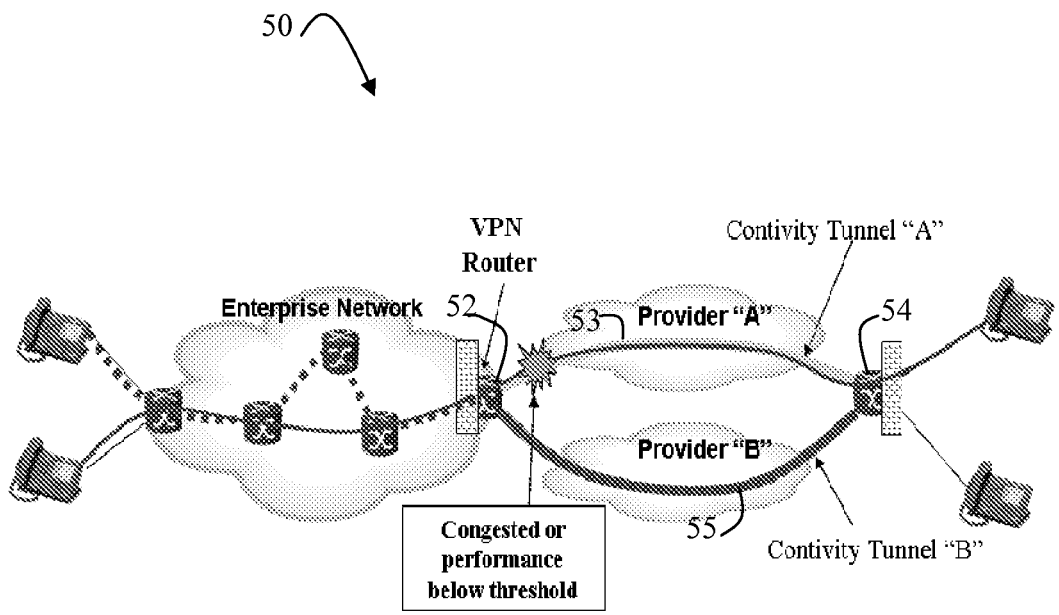

FIG. 1C is a block diagram of a combined LAN/WAN configuration 50 which shows two virtual links between the Edge Routers 52 and 54. Based on the result of the SPF algorithm, one of the two virtual links will be the primary link. Traffic performance measurement is continually performed on both these virtual links to determine state. Based on traffic performance measurement results, virtual link 53 is determined to be in brownout state when a first packet arrives belonging to a new real-time flow Edge Router 52, selects an alternate virtual link 55 that it uncongested and over which measured performance is good. All packets belonging to the flow associated with the first packet will follow the alternate virtual link 55 for the life of the flow or until that virtual link fails.

Thus the present invention provides a flow based service that may be configured to run on physical or virtual links on a Network Element (NE). Each participating NE has the option to use an alternate outbound link, instead of the primary outbound link selected by the Shortest Path Forwarding (SPF) algorithm, under blackout and brownout conditions. It may be used with or without Admission Control mechanism which can be enabled to limit the amount of new flows that can be allowed on all the primary and alternate outbound links and to protect them from getting into brownout state.

Figure 2:
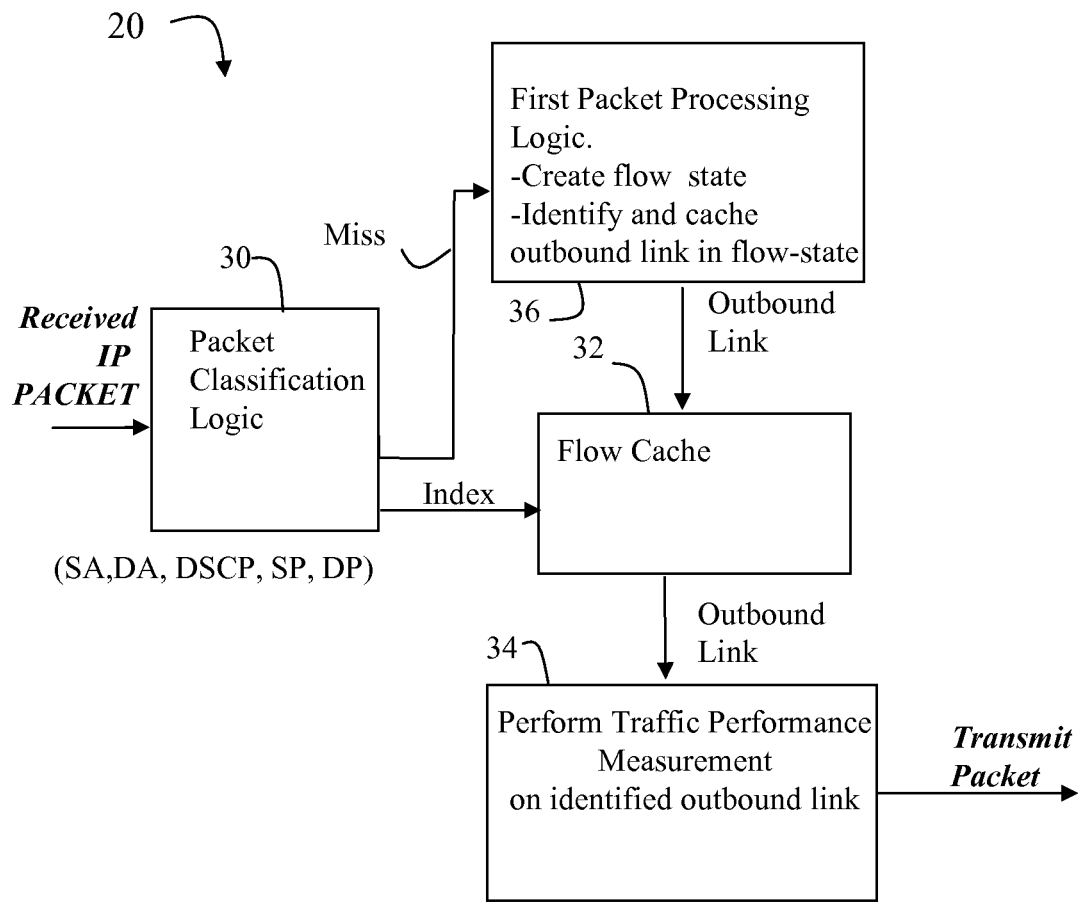
FIG. 2 is a block diagram of several representative components that may be included in forwarding logic of a NE of the present invention.

FIG. 2 illustrates several components that may be included in a NE capable of implementing the present invention. The components may be implemented in hardware, software of any combination thereof. In addition, it is understood that the components are representative of certain functions that may performed by the NE; similar functions may be represented in embodiments that are differently delineated. Accordingly the present invention is not limited by the embodiment illustrate in FIG. 2.

NE 20 includes packet classification logic 30, flow cache 32, real-time traffic performance measurement (includes packet metering, connectivity detection and QoS/performance measurement) 34, first packet processing logic 36. In one embodiment, the packet classification logic generates a key using the end-point information and service class information. For example, the end-point information may include one or more of a Source IP address (SRC IP), Destination IP address (DST IP), SRC Port, DST Port, and service class information may include Differentiated Services Code Point (DSCP). The present invention is not limited to any particular end-point information or service class information when generating a key. For example, port numbers may be used for voice gateways that support many flows to/from the same IP address).

The key is used to index flow cache 32, which stores flow-state including an outbound link for each known or previously processed flow. The existence of flow-state in the flow cache indicates whether the flow has already been processed by first packet processing logic. If flow-state is found, the outbound link included in the flow state is used to transmit the packet on.

If flow-state is not found (new flow, or network failure condition), then a MISS signal is forwarded to first packet processing logic 36, to establish the flow state by identifying an outbound link for the flow. During the selection of outbound link, results of traffic performance measurements of congestion, connectivity and performance, provided by real-time traffic performance measurement 34 are used in selection of valid outbound link. A valid outbound link is selected from one of a primary link and alternate links and is one that meets the above measurement criteria and lowest cost selection. This outbound link is cached in the flow state for subsequent packets of this flow and the packet is then sent out this outbound link. All following packets belonging to that flow will be forward on that outbound link.

Figure 3:
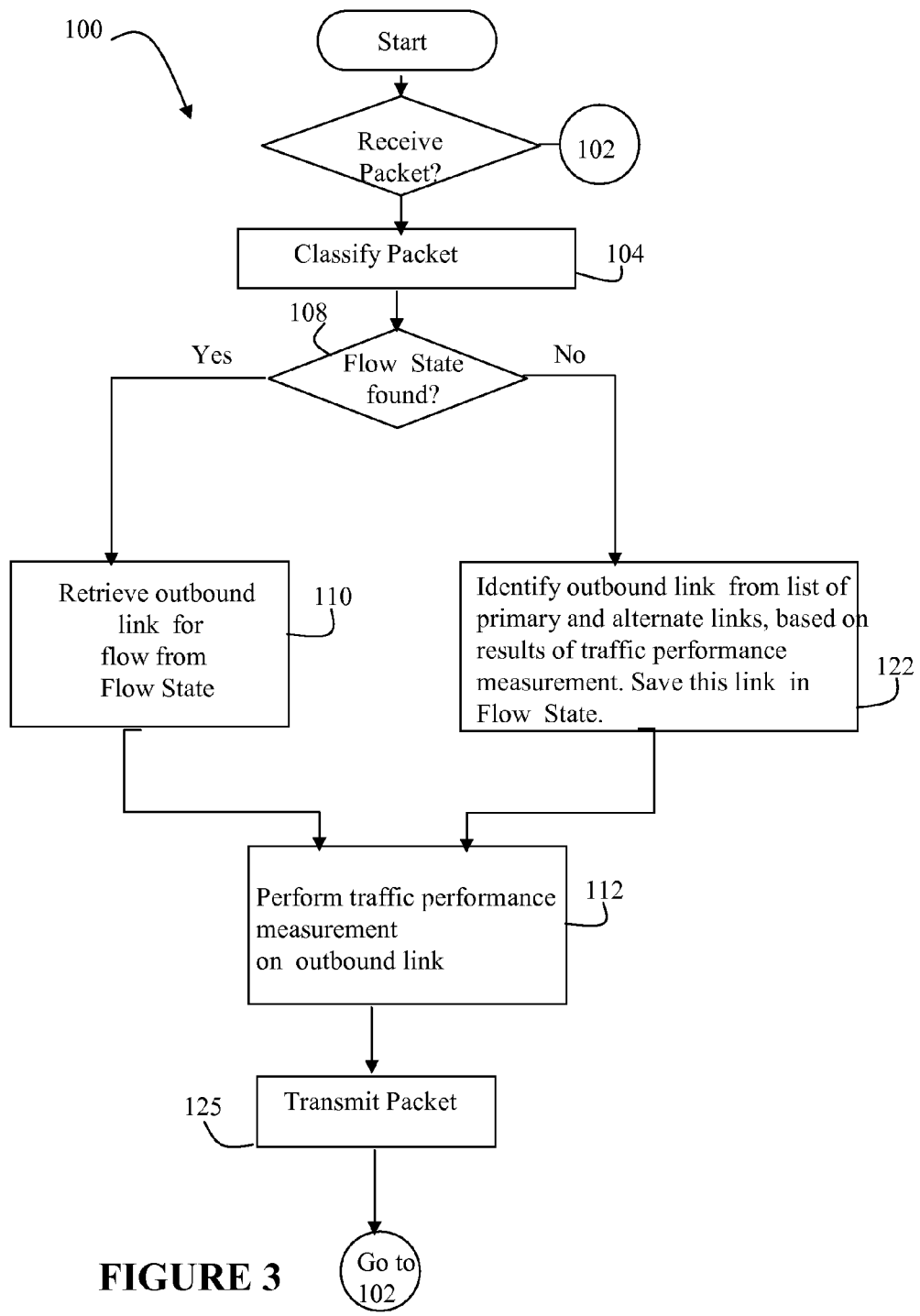
FIG. 3 is a flow diagram illustrating exemplary steps that may be performed by the forwarding logic of FIG. 2 to route traffic flows away from congested points in the network.

FIG. 3 is a flow diagram illustrating several steps of a process 100 that may be performed by a NE supporting the present invention. As described above with regard to FIG. 2, as packets are received at the NE, they are classified to generate a key at step 104, and at step 108 the flow cache is indexed to determine whether the flow has been processed. If the flow has been processed, then at step 110 the outbound link is retrieved from the flow state. At step 112, traffic performance measurement is performed on the outbound link, and a path state of the link is identified, wherein the states may include Up, Brownout, Blackout, etc. Thus a current picture of the traffic congestion on the path is maintained. More detail on congestion measurement is provided below. Once the measurement is complete, the packet is transmitted on the identified outbound link at step 125 and process returns to step 102, awaiting new packets.

If at step 108 there was no flow state in the flow cache, the process proceeds to step 122, where an outbound link is identified from a list of primary and alternate next-hops. The primary next hop may be a neighboring NE identified to be a most desirable neighboring NE based on network information and an executing protocol. In an exemplary embodiment, each of the NEs are Internet Protocol (IP) NEs, which run Interior Gateway Protocols (IGPs) such as OSPF (Open Shortest Path First) or IS-IS (Intermediate System-Intermediate System). OSPF and IS-IS are also known as link state routing protocols. In link state routing protocols each NE composes a link state information packet or advertisement that describes its links to neighbors and the state of each link (up or down). This information is distributed to every NE in the domain using an efficient flooding algorithm that minimizes traffic overhead and ensures that each NE receives every link state advertisement. When the flooding is complete, every NE in the routing domain will have accumulated a database consisting of all the advertised links and their states generated by each participating NE in the topology. The link states may be used to identify the 'best' or primary next-hop device in a path to a destination.

The outbound link is identified at step 122 based on traffic performance measurements of primary and alternate links, after which further packet metering and performance measurement is performed in step 112. Traffic performance measurement may take many forms, known to those of skill in the art, and the present invention is not limited to a particular method of traffic performance measurement, nor is it limited to any particular traffic thresholds. Traffic performance measurements may reflect more than simple congestion; for example path states may be reserved for different combinations of congestion, Quality of Service (QoS), connectivity and other link and/or path related states. For example in one embodiment, UP state may indicate no-congestion, QoS performance good and connectivity OK. Brownout state may indicate congested or QoS/performance below defined limit and connectivity OK. Blackout state may indicate no connectivity (down), or very bad QoS performance.

Depending on the current Traffic Performance Measurement results for the primary and alternate links step 112, at time of first packet processing a decisions is made about whether to route the new flows onto specific alternate links or to allow it to traverse primary link.

The list of alternate paths to any given destination can be identified in a variety of ways. One mechanism for selecting alternate paths to a destination is through the application of Reliable Alternate Paths for IP Destination (RAPID) identification processes, as described in Network Working Group Internet Draft "Basic Specification for IP Fast Reroute: Loop-free Alternates" by A. Atlas, draft-ietf-rtgwg-ipfrr-spec-base-05", February 2006, incorporated herein by reference, or as described in the Network Working Group Internet Draft "IP Fast Reroute Framework", draft-ietf-rtgwg-ipfrr-framework-05.txt, March 2006 by Shand, also incorporated herein by reference.

The typical use of (one or more) RAPID based alternate next-hops is to re-direct traffic on a hop by hop basis, in case of primary next-hop or link failure, thus reducing network down-time. In contrast the present invention uses alternate path information provided by RAPID for redirecting traffic at a flow level granularity. Flows may be forwarded to the alternate path in parallel with the primary path to provide load sharing capability for VoIP traffic.

While RAPID is a preferred method of identifying alternate paths, it is not a requirement of the present invention that RAPID be used; rather pre-configured alternate link(s) corresponding to primary link may be substituted herein without affecting the scope of the invention. Pre-configured links may be used in the case of tunnels where dynamic routing is not being used for tunnel routes.

There are a variety of factors that may be considered when selecting one of a primary or alternate path for a flow, and the present invention is not limited to the consideration of any particular factors. By way of example, a process for selecting a link from the set of primary and alternate links may examine the cost as well as the results of the traffic performance measurement of the link. The lowest cost link not in brownout state is first selected. When there are more than one lowest cost links, not in brownout state, then perform load sharing among them. An Equal Cost Multi Path (ECMP)-like mechanism may be used to distribute flows among these equal cost links, proportional to the capacity of each link for that service class. When all links are in brownout state, packets for new flows must still be forwarded at the risk of causing performance degradation. Packets for such flows are forwarded on the lowest cost link. If there is more than one lowest cost link, load-sharing is performed among them to distribute new flows.

In the presence of a blackout condition, the failed link is removed from the set of primary and alternate links for that destination. Flows that were associated with failed link are now moved to existing links. When, as a result of dynamic routing, a new link is added to the set of primary and alternate links for a destination, new flows may be assigned to the new link using the above described mechanisms.

Thus, the outbound link identified is saved in the newly created flow state in step 122 for future packets for this flow. Traffic performance measurement is performed on this link and packet is transmitted out on this link. The process returns to step 102 where more packets are processed as they are received.

Accordingly a method and apparatus has been shown and described that provides the ability to route new flows onto one or more alternate links if the primary link gets into blackout or brownout state. The present invention may be configured on physical or virtual links on an NE to enhance the forwarding of packets using the primary link and one or more alternate links to a destination. With such an arrangement, a network element can mitigate traffic congestion and bandwidth unavailability on a per service class basis by providing alternate physical or virtual links, and automatically route new flows resulting from blackouts, brownouts, or normal traffic with flow quality of service guarantee. The device can ensure delivery of traffic using multiple alternate outbound links in the presence of brownout condition on the primary outbound link, without re-ordering of packets within flows except for flows resulting from blackouts.

Having described various embodiments of the invention, it will be appreciated that many of the above figures are flowchart illustrations of methods, apparatus (systems) and computer program products according to an embodiment of the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem The above description and figures have included various process steps and components that are illustrative of operations that are performed by the present invention. However, although certain components and steps have been described, it is understood that the descriptions are representative only, other functional delineations or additional steps and components can be added by one of skill in the art, and thus the present invention should not be limited to the specific embodiments disclosed. In addition it is understood that the various representational elements may be implemented in hardware, software running on a computer, or a combination thereof.

While the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

What is claimed is:

1. A computer program product, comprising a non-transitory computer usable medium having a computer readable program code embodied therein, the computer readable program code adapted to be executed to implement a method for selecting a path for a flow comprising a plurality of packets, the method comprising:
    performing traffic performance measurements on a primary path to determine congestion, Quality of Service (QoS), connectivity; and
    selectively routing the flow to an outbound link around the primary path in response to a comparison of the congestion, QoS, and connectivity of the primary path with congestion, QoS, and connectivity of an alternate path.

2. The product of claim 1 wherein the traffic performance measurements indicate performance degradation on the path.

3. The product of claim 1 wherein the traffic performance measurements indicate quality of service issues on the path.

4. The product of claim 1 wherein the traffic performance measurements indicate that the primary path is in a blackout condition indicating a failure in the primary path.

5. The product of claim 4 wherein the failure is a link failure.

6. The product of claim 4 wherein the failure is a node failure.

7. The product of claim 1 wherein the flow traverses a local area network.

8. The product of claim 1 wherein the flow traverses a wide area network.

9. The product of claim 1 further comprising identifying traffic performance measurements on all paths to a destination of the flow, and wherein selectively routing a new flow on to the primary path operates responsive to traffic performance measurements of all paths.

10. The product of claim 1 further comprising storing, for each known end-point, a primary next hop node identifier and one or more alternate next hop node identifiers.

11. The product of claim 10, wherein the outbound link is identified using a list of primary and alternate next hop identifiers.

12. The product of claim 1 further comprising:
receiving a packet;
generating a key using information in the packet; and
determining, using the key, whether the outbound link for forwarding the packet has been previously identified, wherein the steps of identifying and selecting are performed responsive to a determination that the outbound link has not been previously identified.

13. The product of claim 12 wherein the step of determining comprises indexing a flow cache using the key, wherein a flow state stores the outbound link.

14. The product of claim 13 wherein the step of generating a key uses at least one of a Source IP address (SRC IP), a Destination IP address (DST IP), a Differentiated Service Code Point (DSCP), a Source Port or a Destination Port included in the packet.

* * * * *